(12) United States Patent
Ueno et al.

(10) Patent No.: US 8,383,287 B2
(45) Date of Patent: Feb. 26, 2013

(54) FUEL CELL ELECTRODE CATALYST AND POLYMER ELECTROLYTE FUEL CELL USING THE SAME

(75) Inventors: Yukiyoshi Ueno, Gotenba (JP); Hirofumi Iisaka, Toyota (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 405 days.

(21) Appl. No.: 12/668,032

(22) PCT Filed: Jul. 9, 2008

(86) PCT No.: PCT/JP2008/062777
§ 371 (c)(1),
(2), (4) Date: Jan. 7, 2010

(87) PCT Pub. No.: WO2009/008544
PCT Pub. Date: Jan. 15, 2009

(65) Prior Publication Data
US 2010/0323274 A1 Dec. 23, 2010

(30) Foreign Application Priority Data
Jul. 12, 2007 (JP) ................................. 2007-182730

(51) Int. Cl.
| | |
|---|---|
| H01M 4/02 | (2006.01) |
| H01M 4/36 | (2006.01) |
| H01M 4/90 | (2006.01) |
| H01M 4/92 | (2006.01) |
| B01J 21/18 | (2006.01) |
| B01J 23/40 | (2006.01) |
| B01J 23/74 | (2006.01) |

(52) U.S. Cl. ........ 429/487; 429/484; 429/526; 429/527; 502/185

(58) Field of Classification Search .................. 429/484, 429/487, 526, 527; 502/185
See application file for complete search history.

(56) References Cited

U.S. PATENT DOCUMENTS
(Continued)

FOREIGN PATENT DOCUMENTS
| | | |
|---|---|---|
| DE | 100 35 841 | 3/2001 |
| EP | 1 772 916 | 4/2007 |

(Continued)

OTHER PUBLICATIONS

Fiechter, S. et al., "Surface Modified Ruthenium Nanoparticles: Structural Investigation and Surface Analysis of a Novel Catalyst for Oxygen Reduction," J. Phys. Chem. C 2007, 111, pp. 477-487.

(Continued)

*Primary Examiner* — Patricia L Hailey
(74) *Attorney, Agent, or Firm* — Finnegan, Henderson, Farabow, Garrett & Dunner, L.L.P.

(57) ABSTRACT

This invention provides a fuel cell electrode catalyst in which at least one transition metal element and at least one chalcogen element are supported on a conductive support, wherein the fuel cell electrode catalyst comprises a core portion comprising a transition metal crystal and a shell portion comprising surface atoms of the transition metal crystal particle and chalcogen elements coordinating to the surface atoms, and the outer circumference of the core portion is being partially covered with the shell portion. The fuel cell electrode catalyst has a high level of oxygen reduction performance, high activity as a fuel cell catalyst and comprises a transition metal element and a chalcogen element.

8 Claims, 6 Drawing Sheets

U.S. PATENT DOCUMENTS

| | | | |
|---|---|---|---|
| 7,588,857 B2 * | 9/2009 | Alonso-Vante et al. | 429/402 |
| 7,781,364 B2 * | 8/2010 | Zelenay et al. | 502/223 |
| 7,851,399 B2 * | 12/2010 | Choi et al. | 502/216 |
| 2007/0026290 A1 | 2/2007 | AlexandrovichSerov et al. | |
| 2007/0122683 A1 | 5/2007 | AlexandrovichSerov et al. | |
| 2007/0122685 A1 | 5/2007 | AlexandrovichSerov et al. | |
| 2007/0128498 A1 * | 6/2007 | AlexandrovichSerov et al. | 429/40 |

FOREIGN PATENT DOCUMENTS

| | | |
|---|---|---|
| JP | 2001-502467 | 2/2001 |
| JP | 2004-532734 | 10/2004 |
| JP | 2005-44659 | 2/2005 |
| JP | 2005-78978 | 3/2005 |
| JP | 2005-322430 | 11/2005 |
| JP | 2006-260909 | 9/2006 |
| JP | 2007-42519 | 2/2007 |
| JP | 2007-42646 | 2/2007 |
| JP | 2007-66908 | 3/2007 |
| JP | 2007-122935 | 5/2007 |
| JP | 2007-134337 | 5/2007 |
| JP | 2007-157711 | 6/2007 |
| WO | WO 98/18171 | 4/1998 |
| WO | WO 03/004156 A3 | 1/2003 |

OTHER PUBLICATIONS

O. Solorza-Feria et al., "Novel Low-Temperature Synthesis of Semiconducting Transition Metal Chalcogenide Electrocatalyst for Multielectron Charge Transfer: Molecular Oxygen Reduction," Electrochimica Acta, vol. 39, No. 11/12, pp. 1647-1653 (1994).

V. Trapp et al., "New Catalysts for Oxygen Reduction Based on Transition-metal Sulfides," J. Chem. Soc., Faraday Trans., vol. 92, No. 21, pp. 4311-4319 (1996).

R. Reeve et al., "Methanol-tolerant Oxygen Reduction Catalysts Based on Transition Metal Sulfides and their Application to the Study of Methanol Permeation," Electrochimica Acta, vol. 45, pp. 4237-4250 (2000).

Extended European Search Report for EP Appl. No. 08778194.4 dated May 30, 2012.

* cited by examiner

FUEL CELL ELECTRODE CATALYST AND POLYMER ELECTROLYTE FUEL CELL USING THE SAME

CROSS-REFERENCE TO RELATED APPLICATIONS

This application is a national phase application of International Application No. PCT/JP2008/062777, filed Jul. 9, 2008, and claims the priority of Japanese Application No. 2007-182730, filed Jul. 12, 2007, the contents of both of which are incorporated herein by reference.

TECHNICAL FIELD

The present invention relates to a fuel cell electrode catalyst comprising at least one transition metal element and at least one chalcogen element which can replace a conventional platinum catalyst, and a polymer electrolyte fuel cell using the same.

BACKGROUND ART

Anode catalysts used for polymer electrolyte fuel cells are mainly platinum and platinum-alloy-based catalysts. Specifically, catalysts in which a platinum-containing noble metal is supported by carbon black have been used. In terms of practical applications of polymer electrolyte fuel cells, one problem relates to the cost of materials. A means to solve such problem involves reduction of the platinum content.

Meanwhile, it has been known that when oxygen ($O_2$) is electrolytically reduced, superoxide is generated as a result of one-electron reduction, hydrogen peroxide is generated as a result of two-electron reduction, or water is generated as a result of four-electron reduction. When voltage drop occurs for some reason in a fuel cell stack using, as an electrode, a platinum or platinum-based catalyst, four-electron reduction performance deteriorates, resulting in two-electron reduction. Accordingly, hydrogen peroxide is generated, causing MEA deterioration.

Recently, low-cost fuel cell catalysts for a reaction that produces water as a result of four-electron reduction of oxygen have been developed, which will result in elimination of the need for expensive platinum catalysts. Electrochimica Acta, vol. 39, No. 11/12, pp. 1647-1653, 199 discloses that a catalyst comprising a chalcogen element is excellent in terms of four-electron reduction performance and suggests that such catalyst be applied to fuel cells.

Likewise, JP Patent Publication (kohyo) No. 2001-502467 A discloses, as a platinum (Pt) catalyst substitute, an electrode catalyst composed of at least one transition metal and a chalcogen in which an example of a transition metal is Ru and an example of a chalcogen is S or Se. It is also disclosed that, in such case, the Ru:Se molar ratio is from 0.5 to 2 and the stoichiometric number "n" of (Ru)nSe is 1.5 to 2.

Further, JP Patent Publication (kohyo) No. 2004-532734 A discloses, as a Pt catalyst substitute, a fuel cell catalyst material comprising a transition metal that is either Fe or Ru, an organic transition metal complex containing nitrogen, and a chalcogen component such as S.

Further, J. Chem. Soc., Faraday Trans., 1996, 92 (21), 4311-4319 discloses Ru—S, Mo—S, and Mo—Ru—S binary and ternary electrode catalysts and methods for synthesizing the same.

Further, Electrochimica Acta, vol. 45, pp. 4237-4250 2000 discloses Ru—Mo—S and Ru—Mo—Se ternary chalcogenide electrode catalysts.

DISCLOSURE OF THE INVENTION

The structures of catalysts disclosed in the above-mentioned documents were problematic in terms of low oxygen reduction performance and insufficient activity as fuel cell catalysts.

The present inventors have found that the catalyst structure of the fuel cell electrode catalyst comprising a transition metal element and a chalcogen element is closely related to the oxygen reduction performance of such catalyst. Further, they have found that the above problem can be solved by providing a certain catalyst structure. This has led to the completion of the present invention.

Specifically, in a first aspect, the present invention relates to a fuel cell electrode catalyst in which at least one transition metal element and at least one chalcogen element are supported on a conductive support, wherein the fuel cell electrode catalyst comprises a core portion comprising a transition metal crystal and a shell portion comprising surface atoms of the transition metal crystal particle and chalcogen elements coordinating to the surface atoms, the outer circumference of the core portion being partially covered with the shell portion. The shell portion is an ultrathin layer of an atomic order comprising chalcogen elements coordinating to the surface atoms of the transition metal crystal particle. The entire shell portion is not covered with the ultrathin layer, but rather it is partially covered therewith. The structure of such catalyst particle can be varied mainly by the introduction ratio of catalyst components and calcining conditions after the preparation of catalysts.

The reason why the fuel cell electrode catalyst having the structure of the present invention has excellent oxygen reduction performance has not yet been identified; however, such reason is deduced to be as follows. That is, the oxygen molecules adsorption property of the surface of the core portion comprising a transition metal crystal particle is improved and the reaction among the adsorbed oxygen molecules, protons, and electrons is accelerated.

In the present invention, the coverage of the core portion comprising a transition metal crystal with the shell portion comprising transition metals and chalcogen elements; that is, the proportion of chalcogen elements coordinating to the surface atoms of the transition metal crystal in relation to the surface atoms may be selected depending on the oxygen reduction performance of interest. Specifically, the proportion is preferably 22% to 95% in order to achieve oxygen reduction performance that is equivalent to that of a normal platinum catalyst in terms of cost. In order to achieve oxygen reduction performance that is approximately twice as high, the coverage is more preferably 33% to 88%.

The fundamental composition of the fuel cell electrode catalyst of the present invention is that wherein at least one transition metal element and at least one chalcogen element are supported on a conductive support. At least one transition metal element and at least one chalcogen element are represented by general formula $M_1X$ (wherein $M_1$ represents a transition metal element, and X represents a chalcogen element) in the case of a binary catalyst using one transition metal element, for example. In the case of a ternary catalyst using two transition metal elements, those are represented by general formula $M_1M_2X$ (wherein $M_1$ and $M_2$ each represent a transition metal element, and X represents a chalcogen element). Further, a multi-component catalyst using three or more transition metal elements may be used.

Regarding the fuel cell electrode catalyst of the present invention comprising at least one transition metal element and at least one chalcogen element, it is preferable that a transition metal element ($M_1, M_2 \ldots$) is at least one member selected from the group consisting of ruthenium (Ru), molybdenum (Mo), osmium (Os), cobalt (Co), rhodium (Rh), iridium (Ir), iron (Fe), nickel (Ni), palladium (Pd), and rhenium (Re), and a chalcogen element (X) is at least one member selected from the group consisting of sulfur (S), selenium (Se), and tellurium (Te).

In a second aspect, the present invention relates to a polymer electrolyte fuel cell comprising the above fuel cell electrode catalyst.

The fuel cell electrode catalyst of the present invention has a higher level of oxygen reduction performance and higher activity than a conventional transition metal-chalcogen element-based catalyst, and thus it can serve as a platinum catalyst substitute.

BEST MODES FOR CARRYING OUT THE INVENTION

Figure 1:
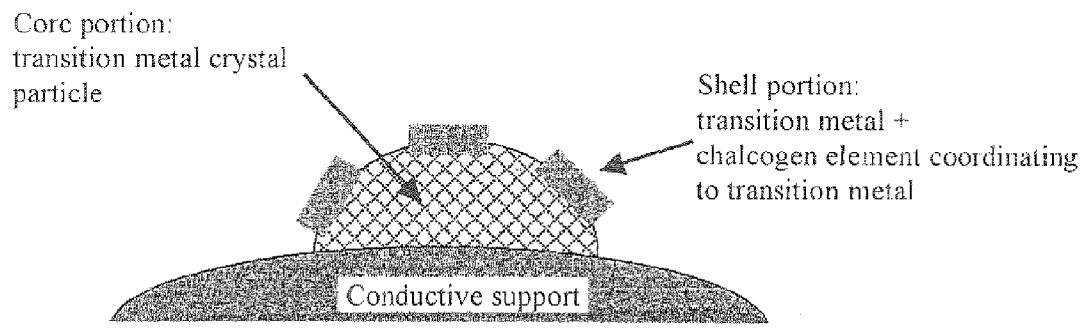
FIG. 1 schematically shows the structure of the fuel cell electrode catalyst of the present invention.

FIG. 1 schematically shows the structure of the fuel cell electrode catalyst the present invention. At least one transition metal element and at least one chalcogen element are supported on a conductive support. The core portion comprising a transition metal crystal is directly supported on the conductive support, and the surface of the core portion is partially covered with the shell portion. The shell portion comprises the surface atoms of the transition metal crystal particle and chalcogen elements coordinating to the surface atoms.

Hereinafter, the present invention is described in more detail with reference to the Examples and the Comparative Examples.

[Catalyst Preparation]

Ruthenium carbonyl and sulfur were heated at 140° C. under argon atmosphere and then cooled. Thereafter, the resultant was washed with acetone and filtered. The amounts of sulfur introduced (mol %) relative to ruthenium were 0, 20, 37, 45 and 56%. The obtained filtrate Ru—S/C was calcined at 350° C. for 1 hour and a catalyst is prepared. According to this procedure, chalcogenide-based binary catalysts with a varied composition were prepared.

Also, commercially available $RuS_2$ was used as a catalyst in which the amount of sulfur introduced (mol %) is 67%.

[Structural Analysis]

The above catalyst materials were subjected to structural analyses via TEM, EXAFS, and XPS.

Figure 2:
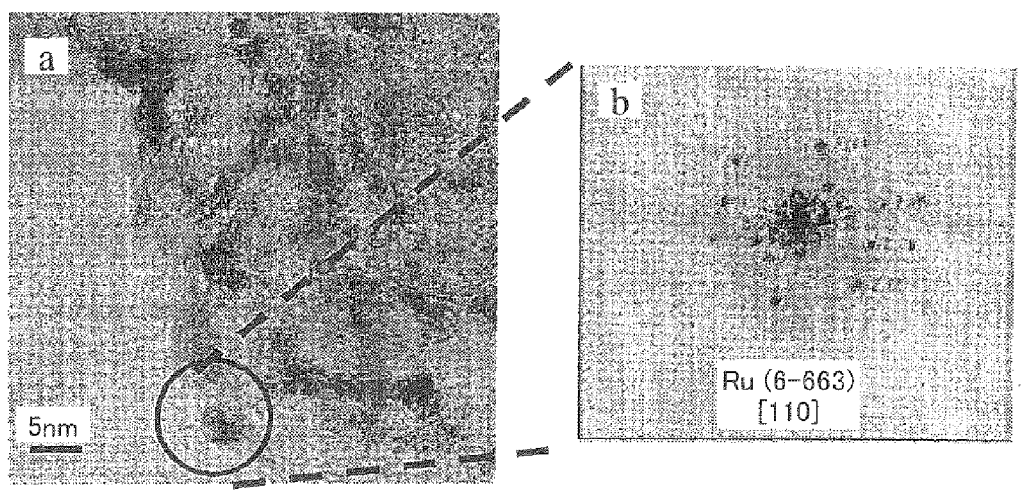
FIG. 2 shows the results of TEM observation.

FIG. 2 shows the results of TEM observation. As a result of TEM observation, metal particles having particle diameters of 3 to 4 nm were observed. As a result of X-ray analysis, the metal particles were found to have the metal crystal lattice of Ru. That is, there are no sulfur atom in the metal particles.

Figure 3:
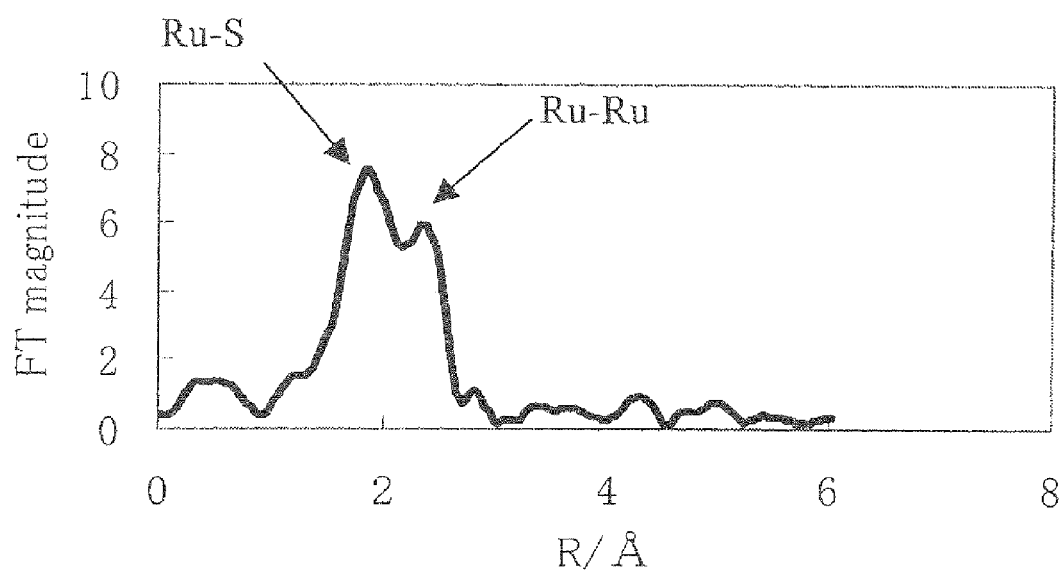
FIG. 3 shows the results of EXAFS analysis of interatomic bonds on the surface of the catalyst material.

FIG. 3 shows the results of EXAFS analysis of interatomic bonds of the catalyst material. As a result of EXAFS analysis of interatomic bonds on the surface of the catalyst material, Ru—Ru and Ru—S coordination were observed. That is, sulfur atoms are coordinating to ruthenium atoms on the metal particle surface.

Figure 4:
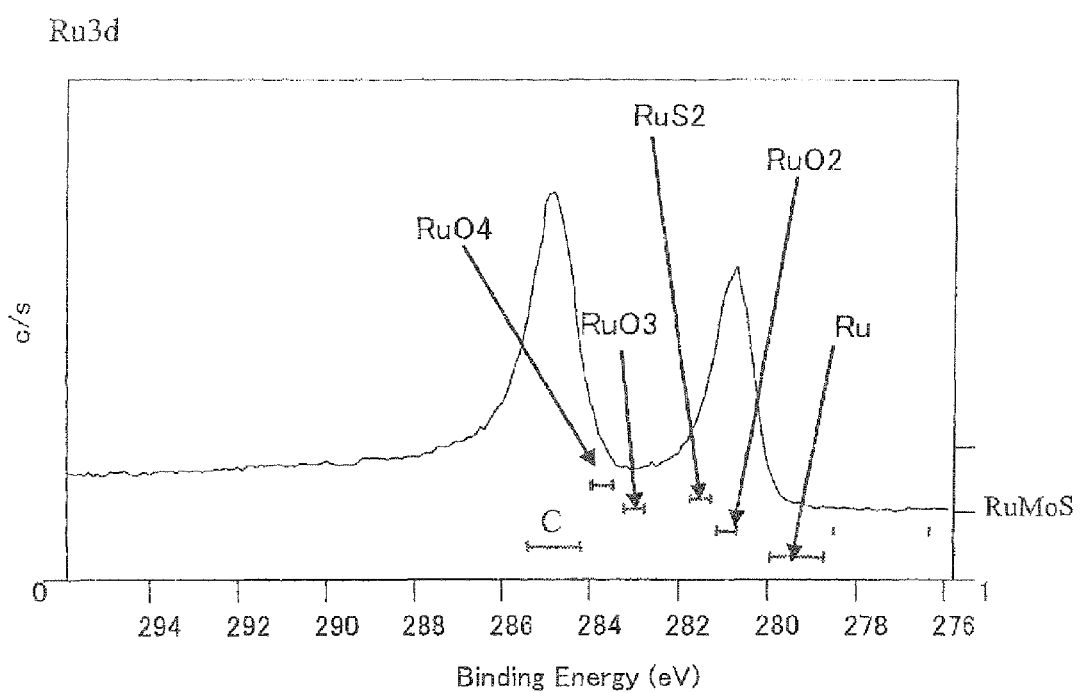
FIG. 4 shows the results of XPS analysis of Ru compounds on the surface of the catalyst material (Ru3d analysis).
Figure 5:
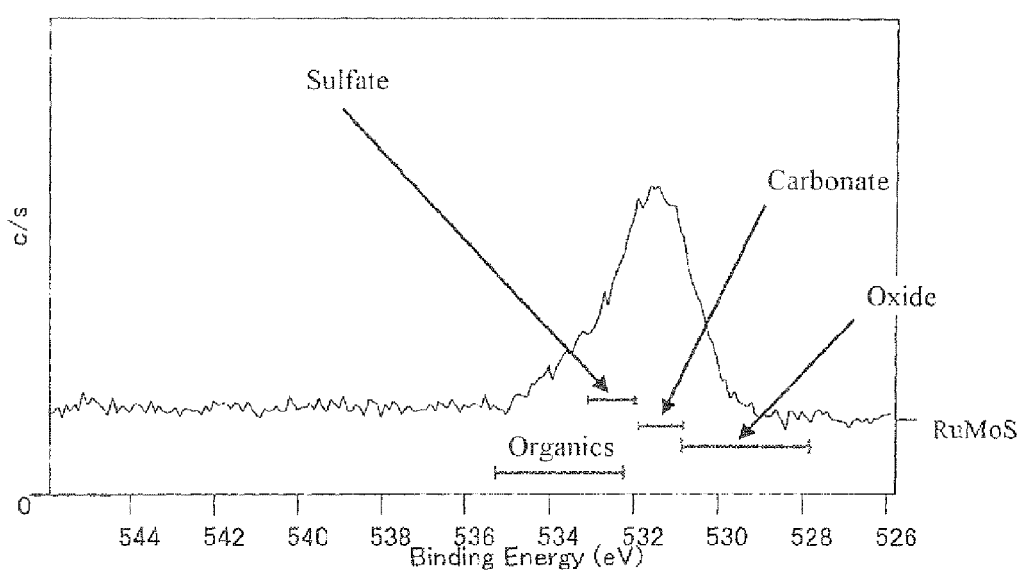
FIG. 5 shows the results of XPS analysis of S compounds on the surface of the catalyst material (S2p analysis).

FIG. 4 shows the results of XPS analysis of Ru compounds on the surface of the catalyst material (Ru3d analysis). Also, FIG. 5 shows the results of XPS analysis of S compounds on the surface of the catalyst material (S2p analysis). As a result of XPS analysis of Ru compounds on the surface of the catalyst material (Ru3d analysis), a peak was observed between the binding energies derived from $RuO_2$ and $RuS_2$. As a result of EXAFS analysis, coordination of O to Ru was not observed. Thus, $RuO_2$ is deduced to bonds between the Ru metal surface and oxygen in the air. As a result of XPS analysis of S compounds on the surface of the catalyst material (S2p analysis), the existence of S compound was observed on the surface of a catalyst material.

As a result of structural analyses via TEM, EXAFS, and XPS, the structure of the catalyst of the present invention was found to be the structure that is schematically shown in FIG. 1.

[Valence Band Structure and Catalyst Performance]

Regarding the above catalyst materials, the correlation between the coverage and catalyst activity was determined. Table 1 shows the results of analysis and evaluation of the prepared catalysts.

Here, the shell portion is defined to comprise the surface atoms of transition metal (Ru) particle and chalcogen elements coordinating thereto. The coverage represents the proportion of chalcogen elements coordinated in relation to the surface atoms of transition metal (Ru) particles. Since Ru metal has the closest-packed hexagonal structure, the possible coordination number of the Ru atoms on the surface to the chalcogen elements is 4 at maximum. Thus, the coordination number is 4 when the coverage is 100%. The coordination number determined via EXAFS is the average of the coordination number of chalcogen elements to the transition metal (Ru) atoms. The coverage is represented by the following equation.

$$\text{Coverage (\%)} = \{(\text{coordination number determined via EXAFS})/4\} \times 100$$

TABLE 1

| Percentage of S (mol %) | 0 | 20 | 37 | 45 | 56 | 67 |
|---|---|---|---|---|---|---|
| Coordination number | 0 | 0.721 | 1.366 | 2.144 | 3.335 | 4 |
| Coverage | 0 | 18.025 | 34.15 | 53.6 | 83.375 | 100 |
| Current value for oxygen reduction | 0.0E+00 | 1.5E−05 | 4.9E−05 | 8.1E−05 | 6.0E−05 | 0.0E−05 |

Figure 6:
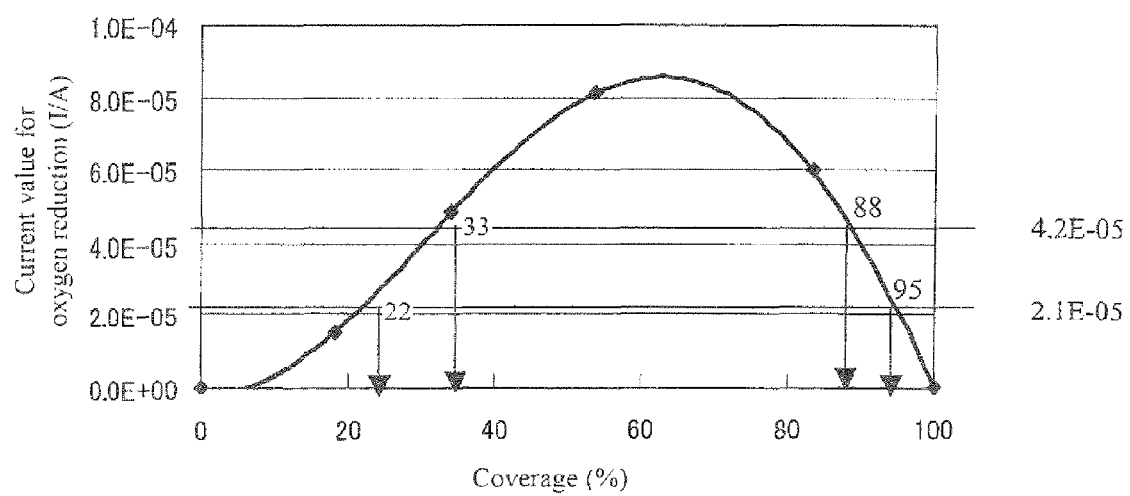
FIG. 6 shows the correlation between the coverage (%) and the current value for oxygen reduction (I/A).

FIG. 6 shows the correlation between the coverage (%) and the current value for oxygen reduction (I/A). The results shown in FIG. 6 indicate that the coverage should be 22% to 95% in order to exhibit a current value for oxygen reduction that is equivalent to the one of a normal platinum catalyst (2.1E−05) in terms of cost. In order to exhibit a current value for oxygen reduction that is approximately two times higher (4.2E−05), the coverage should be 33% to 88%.

INDUSTRIAL APPLICABILITY

The fuel cell electrode catalyst of the present invention has a high level of oxygen reduction performance and high activity, and thus it can serve as a platinum catalyst substitute. Therefore, the present invention contributes to the practical and widespread use of fuel cells.

The invention claimed is:

1. A fuel cell electrode catalyst in which at least one transition metal element selected from the group consisting of ruthenium (Ru), molybdenum (Mo), osmium (Os), cobalt (Co), rhodium (Rh), iridium (Ir), iron (Fe), nickel (Ni), palladium (Pd), and rhenium (Re) and at least one chalcogen element selected from the group consisting of sulfur (S), selenium (Se), and tellurium (Te) are supported on a conductive support,
wherein the fuel cell electrode catalyst comprises:
a core portion comprising a conductive support and a transition metal crystal directly supported on the conductive support and
a shell portion comprising chalcogen elements and surface atoms of the transition metal crystal to which the chalcogen elements are coordinating, and
the outer circumference of the core portion is partially covered with the shell portion.

2. The fuel cell electrode catalyst according to claim 1, wherein the proportion of a coordination number of chalcogen elements to a maximum possible coordination number of the surface atoms of the transition metal crystal with respect to the chalcogen elements is 22% to 95%.

3. The fuel cell electrode catalyst according to claim 1, wherein the proportion of a coordination number of chalcogen elements to a maximum possible coordination number of the surface atoms of the transition metal crystal with respect to the chalcogen elements is 33% to 88%.

4. The fuel cell electrode catalyst according to claim 1, wherein the transition metal element includes at least ruthenium (Ru).

5. A polymer electrolyte fuel cell comprising the fuel cell electrode catalyst according to claim 1.

6. The fuel cell electrode catalyst according to claim 1, wherein the chalcogen element is sulfur (S).

7. A fuel cell electrode catalyst, comprising:
a conductive support;
a core portion comprising a conductive support and a transition metal crystal directly supported on the conductive support; and
a shell portion comprising chalcogen elements and surface atoms of the transition metal crystal to which the chalcogen elements are coordinating,
wherein the outer circumference of the core portion is partially covered with the shell portion,
wherein the transition metal crystal comprises at least one transition metal element selected from the group consisting of ruthenium (Ru), molybdenum (Mo), osmium (Os), cobalt (Co), rhodium (Rh), iridium (Ir), iron (Fe), nickel (Ni), palladium (Pd), and rhenium (Re), and
wherein the chalcogen elements comprise at least one chalcogen element selected from the group consisting of sulfur (S), selenium (Se), and tellurium (Te), and
wherein the proportion of a coordination number of chalcogen elements to a maximum possible coordination number of the surface atoms of the transition metal crystal with respect to the chalcogen elements is 33% to 88%.

8. The fuel cell electrode catalyst according to claim 7, wherein the proportion of a coordination number of chalcogen elements to a maximum possible coordination number of the surface atoms of the transition metal crystal with respect to the chalcogen elements is 34.15% to 83.375%.

* * * * *